United States Patent [19]
Guerini

[11] Patent Number: 5,974,026
[45] Date of Patent: Oct. 26, 1999

[54] ANTI-RATTLE MECHANISM FOR A REMOVABLE VIDEO DISK CARTRIDGE

[75] Inventor: Albert Guerini, Gilroy, Calif.

[73] Assignee: Castlewood Systems, Inc., Pleasanton, Calif.

[21] Appl. No.: 08/970,860

[22] Filed: Nov. 14, 1997

[51] Int. Cl.$^6$ .................................. G11B 3/70; G11B 7/26
[52] U.S. Cl. .............................................................. 369/291
[58] Field of Search ................................ 360/133, 99.05, 360/99.12, 98.08; 369/291

[56] References Cited

U.S. PATENT DOCUMENTS

| 4,980,883 | 12/1990 | Mutou et al. | 369/291 |
| 5,650,899 | 7/1997 | Schick et al. | 360/133 |

Primary Examiner—George J. Letscher
Attorney, Agent, or Firm—Townsend and Townsend and Crew LLP

[57] ABSTRACT

Devices, systems, and methods prevent rigid video recording media from rattling within a cartridge when that cartridge is removed from a disk drive. To decrease rattling (and the resulting damage to the disk), the disk is resiliently biased against an inner surface of the cartridge housing. A door translates laterally to provide access to the disk within the cartridge. A feature is defined by an inner surface of the cartridge housing, and a resilient arm extends inward from the door so as to engage the feature when the door moves towards a closed position. The feature deflects the arm axially against the disk, so that the arm acts as both an actuation mechanism and a biasing spring.

14 Claims, 9 Drawing Sheets

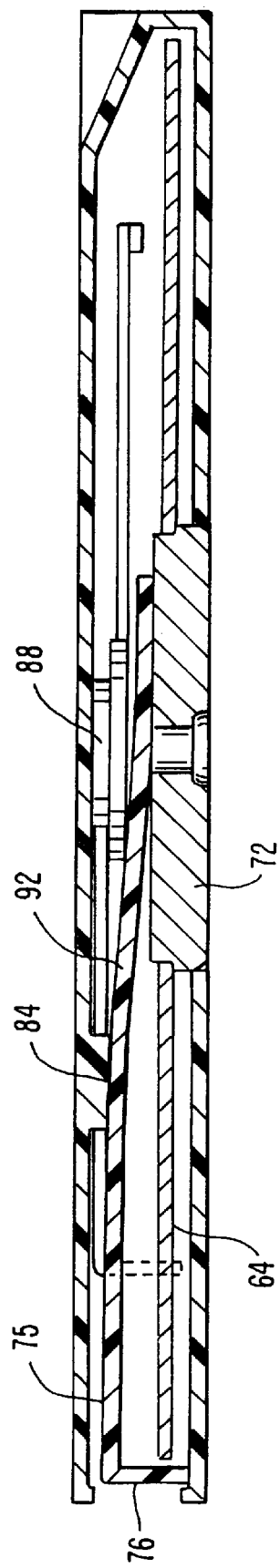

ANTI-RATTLE MECHANISM FOR A REMOVABLE VIDEO DISK CARTRIDGE

BACKGROUND OF THE INVENTION

The present invention is generally related to recording systems for digital video and other data, and in particular, provides a mechanism which avoids rattling of a rigid recording disk within a cartridge when the cartridge is removed from a disk drive system.

Video Cassette Recorders ("VCRs") dominate the consumer video market, due in part to their combination of low cost and recording capabilities. VCR analog magnetic tape recording cassettes can be used to record, play-back, and store video images in a format which is well adapted for use with existing analog television signals. The ability to record allows consumers to use the standard VHS VCR to save television shows and home movies, as well as for play-back of feature films.

The structure of VCR systems and recording media are adapted to record and archive existing television signals. Specifically, a large amount of analog data is presented on a standard television screen during a standard length feature film. VCR systems record this analog data using analog tape recording media. The VCR tape cassettes can be removed from the recording/play-back equipment for storage, thereby minimizing the system costs when large numbers of movies are stored.

While VCR systems successfully provide recording and archive capabilities at low cost, these existing consumer video systems have significant disadvantages. For example, accessing selected portions of a movie stored on a VCR tape can be quite slow. In particular, the cassette must be rewound to the beginning of the movie between each showing, which can involve a considerable delay. Additionally, transferring data to and from the tape takes a substantial amount of time. There has been little incentive to provide high speed accessing and transfer of the video data, as movies are typically recorded and played by the consumer in real time. Alternatives providing faster access are commercially available (for example, optical video disks), but these alternatives generally have not been able to overcome the VCR's low cost and recording capabilities.

Recent developments in video technology may decrease the VCR's advantages over alternative systems. Specifically, standard protocols have recently been established for High Definition TeleVision ("HDTV"). Although digital video cassette tapes are already available, the amount of data presented in a single HDTV feature film using some of the new protocols will represent a substantial increase over existing digital VCR system capacities. Optical disks may be able to accommodate these larger quantities of digital data. Unfortunately, despite many years of development, a successful low cost optical recording system has remained an elusive goal.

Personal computer magnetic data storage systems have evolved with structures which are quite different than consumer video storage systems. Modern personal computers often include a rigid magnetic disk which is fixed in an associated disk drive. These hard disk drive systems are adapted to access and transfer data to and from the recording surface at high rates. It is generally advantageous to increase the total data storage capacity of each hard disk, as the disks themselves are typically fixed in the drive system. Hence, much of the data that is commonly used by the computer is stored on a single disk.

The simplicity provided by a fixed disk drive system helps maintain overall system reliability, and also helps reduce the overall storage system costs. Nonetheless, removable hard disk cartridge systems have recently become commercially available, and are now gaining some acceptance. While considerable quantities of computer data can be stored using these removable hard disk cartridge systems, their complexity, less than ideal reliability, and cost has limited their use to selected numbers of high-end personal computer users.

One particular disadvantage of known removable hard disk computer storage systems is the complexity (and the associated cost) of the hard disk cartridges. The delicate disks are generally surrounded by a cartridge housing, and the housing is often substantially sealed by a door when the cartridge is removed from the disk drive. To prevent the disk from banging against the surrounding cartridge housing during handling, known removable computer hard drive cartridges often include a complex disk biasing mechanism with several separate movable parts. These biasing mechanisms, which are sometimes called "anti-rattle" devices, add significantly to the manufacture and assembly costs for removable computer hard disk cartridges.

In light of the above, it would be desirable to provide improved data storage systems, devices, and methods for storing video and other data. It would be particularly desirable if these improved systems, devices and methods were adapted for digital video data such as the new HDTV protocols, and had the ability to record, archive, and access digital feature films with good reliability and at a low system cost.

SUMMARY OF THE INVENTION

The present invention provides improved devices, systems, and methods for storing and archiving digital video and other data. More specifically, the invention provides a simple, reliable, and low cost mechanism which prevents a rigid recording disk from rattling within a cartridge when that cartridge is removed from a disk drive. The disk is resiliently biased against an inner surface of the cartridge housing by an arm extending from a door of the cartridge. The door will typically translate laterally to provide access to the disk within the cartridge. A resilient arm extends inward from the door. The arm engages a feature defined by an inner surface of the cartridge housing when the door moves towards a closed position. The feature deflects the arm axially against the disk, so that the resilient arm can act as both an actuation mechanism and a biasing spring. This provides an elegant cartridge anti-rattle mechanism having a low number of parts, thereby reducing manufacturing costs, assembly time, and failures of the data cartridge.

In a first aspect, the present invention provides a disk drive system for use with digital video and other data, the system comprising a cartridge housing. A feature and a disk are disposed within the housing, and a door is mounted to the housing. An arm extends from the door and is deflected by the feature as the door moves between an open position and a closed position. As a result, the arm urges the disk against the cartridge housing when the door is in the closed position. A disk drive includes a cartridge receptacle having a surface that moves the door from the closed position towards the open position when the cartridge is inserted therein.

Typically, the arm is adapted to smoothly engage a ramp, rounded bump, or other feature on the inner surface of the housing.

In another aspect, the invention provides a cartridge for use with a disk drive. The cartridge comprises a cartridge housing having an inner surface. The inner surface of the housing defines a feature, and a disk is disposed within the housing. The door is mounted to the housing and is movable between an open position and a closed position. A resilient arm extends from the door. The feature deflects the arm when the door moves between an open position and a closed position, so that the arm biases the disk against the cartridge housing when the door is in the closed position.

In another aspect, the present invention provides a method for preventing a rigid disk from rattling within a disk cartridge housing after the cartridge is removed from a disk drive. The method comprises biasing the disk against the cartridge housing by deflecting an arm. The arm extends inward from the door of the housing.

BRIEF DESCRIPTION OF THE DRAWINGS

FIG. 9 is a cross-sectional view through the deflected arm of the cartridge of FIG. 3.

DESCRIPTION OF THE PREFERRED EMBODIMENT

The devices, systems, and methods of the present invention generally help restrain recording media such as rigid magnetic disks within disk cartridges. The cartridges of the present invention will preferably contain a single two sided rigid magnetic recording disk which is capable of storing at least about 2.4 gigabytes of data, ideally being capable of storing at least about 4.7 gigabytes of data. The cartridges, disk drive systems, and data storage methods of the present invention are particularly well suited for use in recording, archiving, and playing back digital video data. In fact, due to the low cost, large capacity, and archivability of the recording systems of the present invention, a standard length movie in an AMPAC I or AMPAC II format (as suitable for high definition television or "HDTV") may be stored using no more than two cartridges, and ideally may be stored on a single cartridge having a single, two sided hard disk. Additionally, these devices and methods will find applications for storing a wide variety of data for use with notebook computers, desktop computers, and more powerful computer workstations, thereby expanding the benefits of the huge economies of scale provided by the consumer video market to other users of digital data storage.

Figure 1:
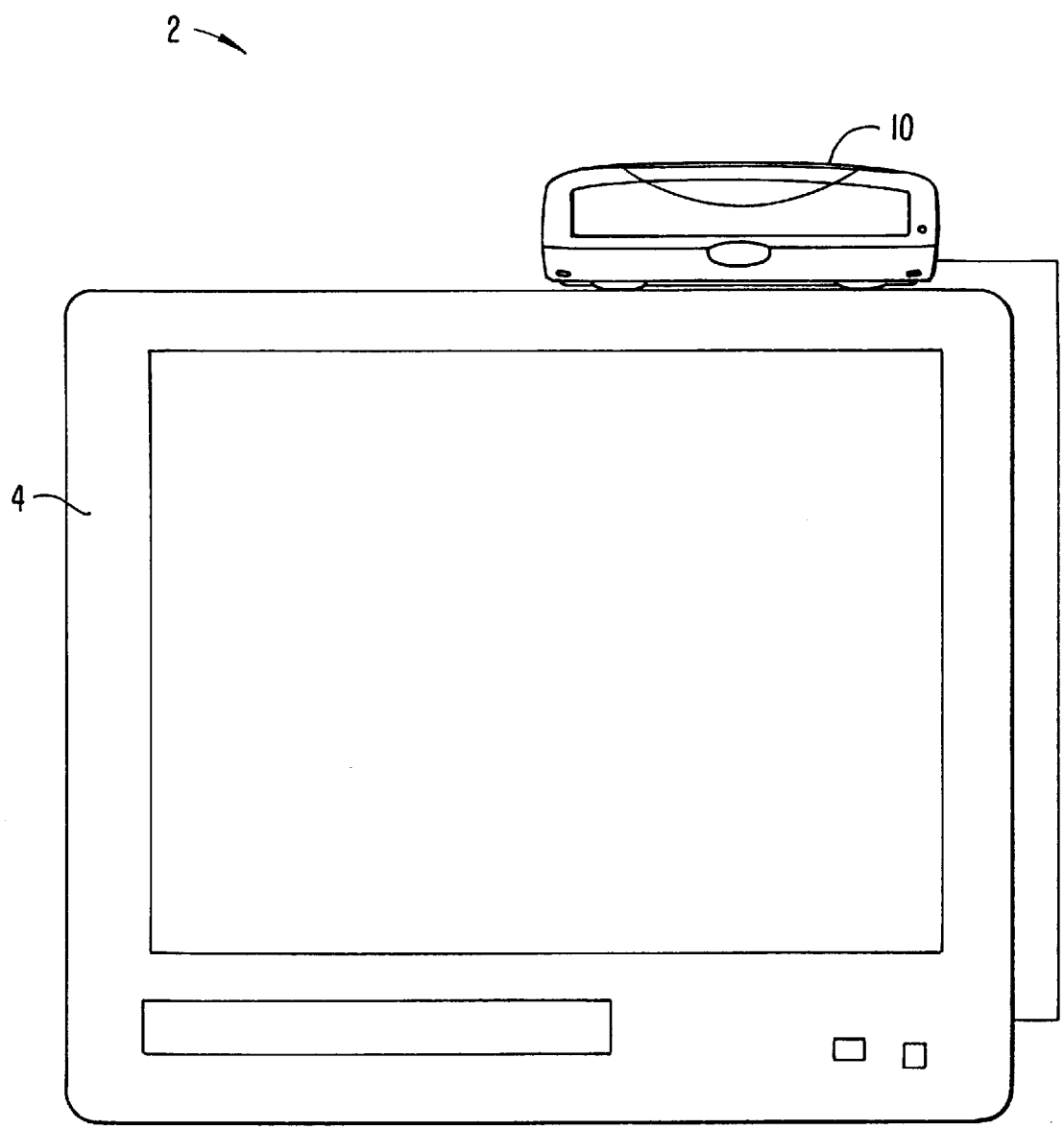
FIG. 1 is a schematic illustration of a video system including a high definition television and an external disk drive, according to the principles of the present invention.

As schematically illustrated in FIG. 1, a video system 2 includes a high definition television ("HDTV") 4 which is directly coupled to an external disk drive 10. External drive 10 will read recorded digital data from a removable disk cartridge, and will transmit that data to HDTV 4, preferably using one of the standard formats or protocols now being established. No general purpose computer need be coupled between external drive 10 and HDTV 4, although such a general purpose computer may be incorporated into video system 2 to allow flexible manipulation of the video data. In the exemplary embodiment, external drive 10 is less than 2 in. by less than 5½ in. by less than 7 in. The small size of the drive (and the small size of the disks on which the movies are stored) helps decrease the overall space which is required for video systems and the associated movie library.

Figure 1A:
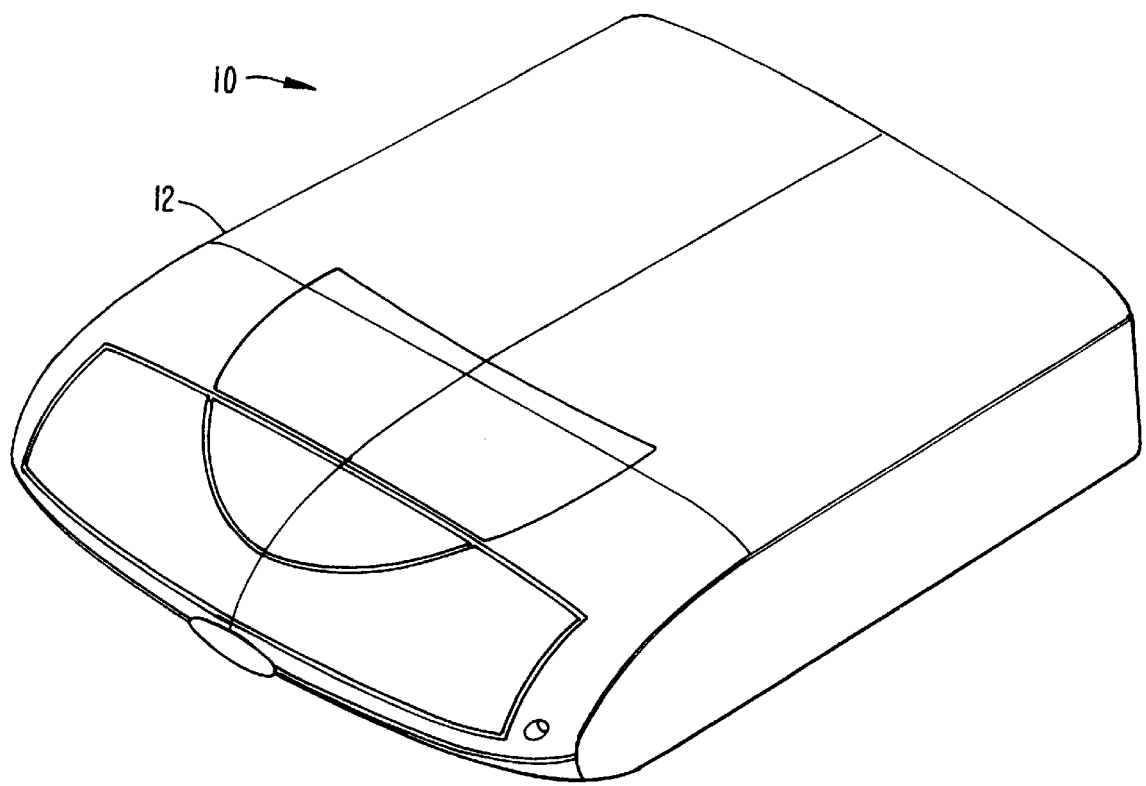
FIG. 1A is a perspective view of the external disk drive of FIG. 1, the external drive being adapted for use with a removable rigid recording disk cartridge.
Figure 1B:
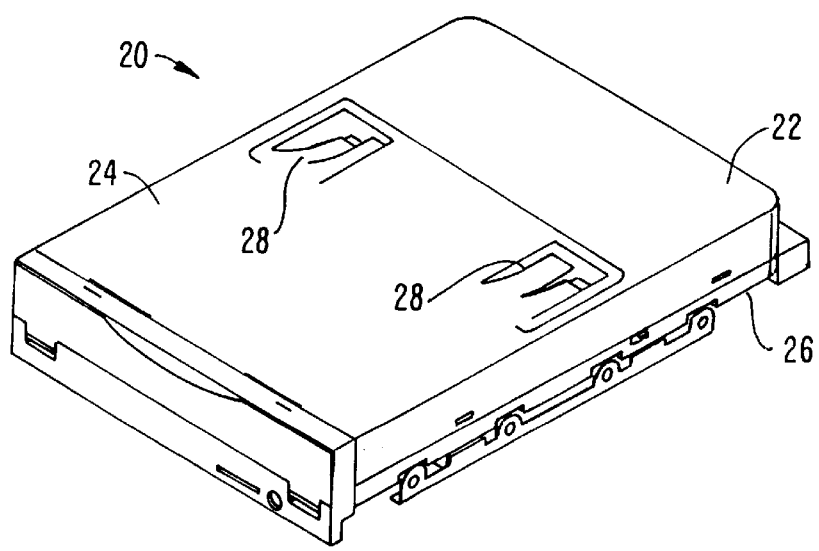
FIG. 1B is a perspective view of an internal disk drive similar to the external drive of FIG. 1A, in which the internal drive is adapted for insertion into a standard bay of a computer.

Referring now to FIGS. 1A and 1B, external disk drive 10 and an internal disk drive 20 will share many of the same components. However, external drive 10 will include an enclosure 12 adapted for use outside of a personal computer, a high definition television, or the like. Additionally, external drive 10 will typically include standard I/O connectors, parallel ports, and/or power plugs similar to those of known computer peripheral or video devices.

Internal drive 20 will typically be adapted for insertion into a standard bay of a computer. In some embodiments, internal drive 10 may instead be used within a bay in a HDTV, thereby providing an integral video system. Internal drive 20 may optionally be adapted for use with bays having a form factor of 2.5 inches, 1.8 inches, 1 inch, or with any other generally recognized or proprietary bay. Regardless, internal drive 20 will typically have a housing 22 which includes a housing cover 24 and a base plate 26. As illustrated in FIG. 1B, cover 24 will preferably include integral springs 28 to bias the cartridge downward within the receiver of housing 22. It should be understood that while external drive 10 may be very different in appearance than internal drive 20, the external drive will preferably make use of base plate 26, cover 24, and most or all of the mechanical, electromechanical, and electronic components of internal drive 20. In the exemplary embodiment, cover 24 is modified for use with external drive 10 so that a label on the cartridge is at least partially visible through a window along the upper surface of enclosure 12.

Figure 2:
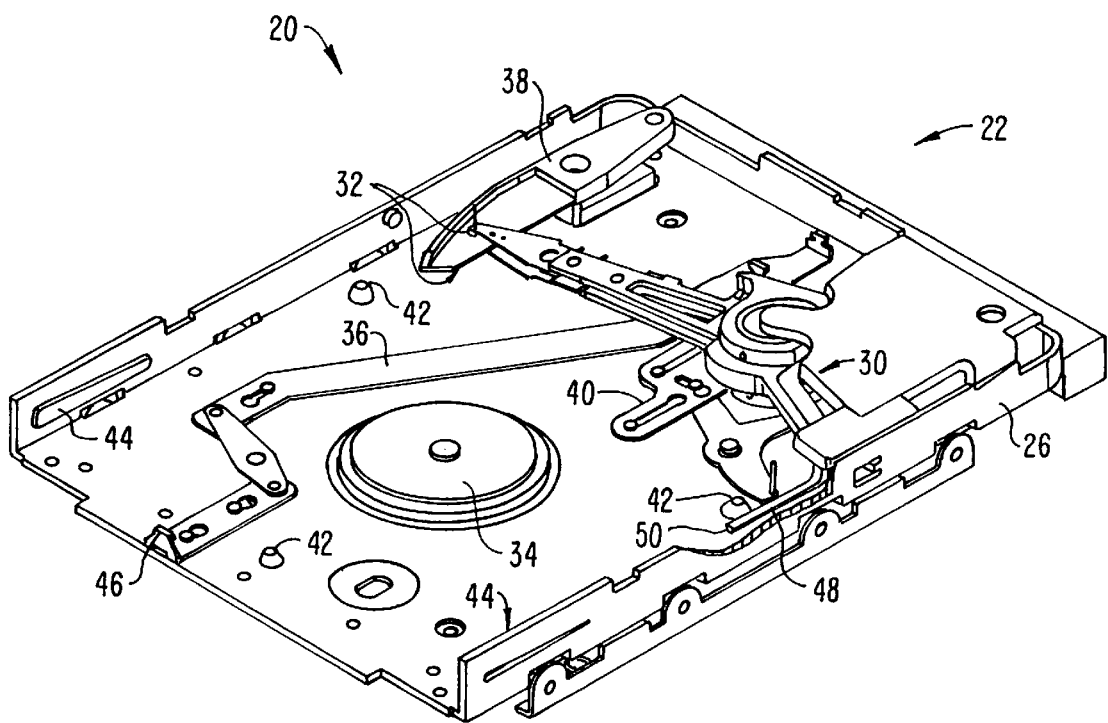
FIG. 2 is a perspective view of the internal disk drive of FIG. 1B, in which a cover of the disk drive has been removed to show a receptacle for the removable cartridge and some of the major disk drive components.

Many of the components of internal drive 20 are visible when cover 22 has been removed, as illustrated in FIG. 2. In this exemplary embodiment, a voice coil motor 30 rotationally positions first and second heads 32 along opposed recording surfaces of the hard disk while the disk is spun by spindle drive motor 34. A release linkage 36 is mechanically coupled to voice coil motor 30, so that the voice coil motor effects release of the cartridge from housing 22 when heads 32 move to a release position on a head load ramp 38. Head load ramp 38 is preferably adjustable in height above base plate 26 to facilitate accurately aligning the head load ramp with the rotating disk.

A head retract linkage 40 helps to ensure that heads 32 are retracted from the disk and onto head load ramp 38 when the cartridge is removed from housing 22. Head retract linkage 40 may also be used as an inner crash stop to mechanically limit travel of heads 32 toward the hub of the disk.

Base 26 preferably comprises a steel sheet metal structure, in which the shape of the base is substantially defined by stamping. Datums 42 are stamped into base 26 to engage and accurately position associated lower surfaces of the cartridge housing. To help ensure accurate engagement of the cartridge with spindle drive 34, rails 44 maintain the cartridge above the spindle until the cartridge is inserted to the appropriate depth, whereupon the cartridge descends under the influence of cover springs 28 to bring the hub of the disk down into aligned engagement with spindle drive 34. A latch 46 of release linkage 36 engages a detent of the cartridge to restrain and maintain orientation of the cartridge within housing 22.

Of particular importance to the anti-rattle mechanism of the present invention, a shaft 48 having a door actuation surface 50 extends from the structure supporting voice coil motor 30. Note that a portion of a sidewall of base plate 26 has been removed to more clearly show the structure and orientation of shaft 48.

Figure 3:
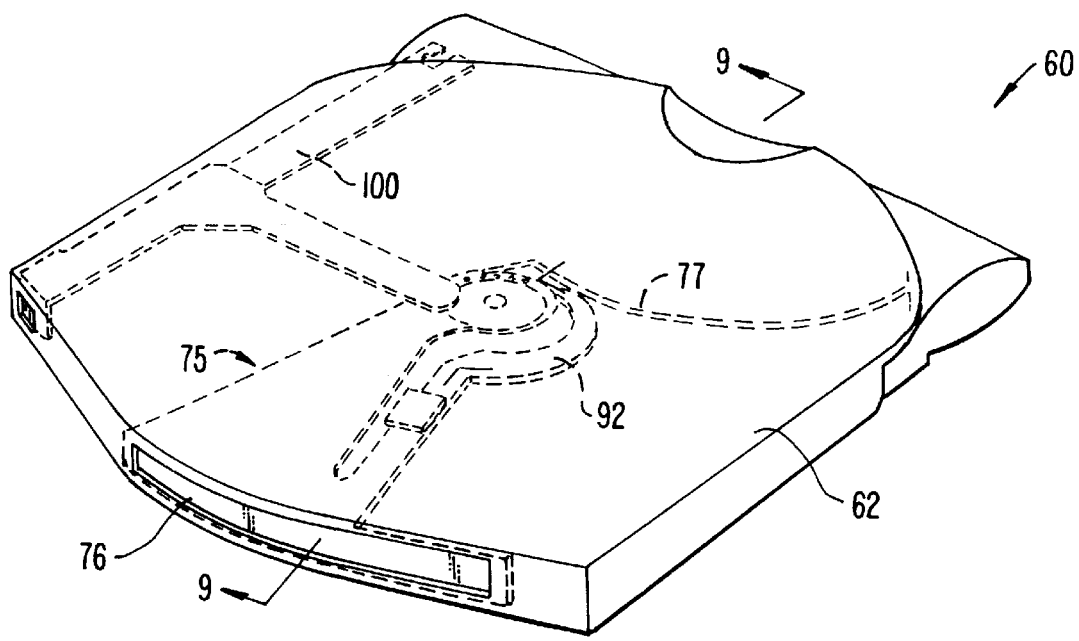
FIG. 3 is a perspective view of a removable cartridge housing a rigid magnetic recording disk, in which the removable cartridge includes a door and an arm extending from the door.
Figure 3A:
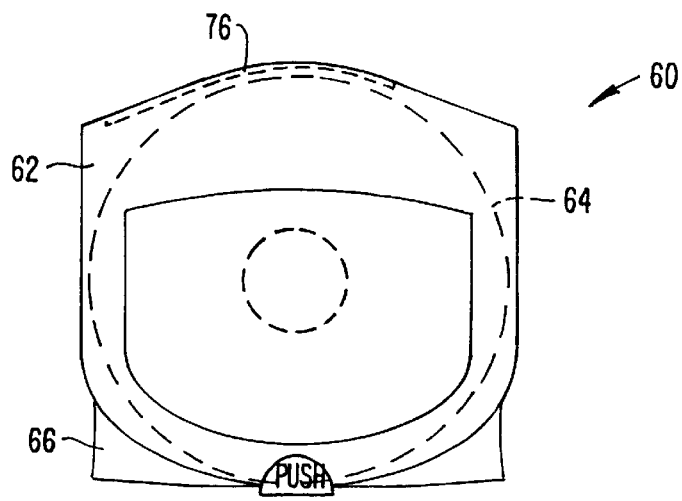
FIG. 3A is a top view of the cartridge of FIG. 3, showing an upper cartridge housing.
Figure 3B:
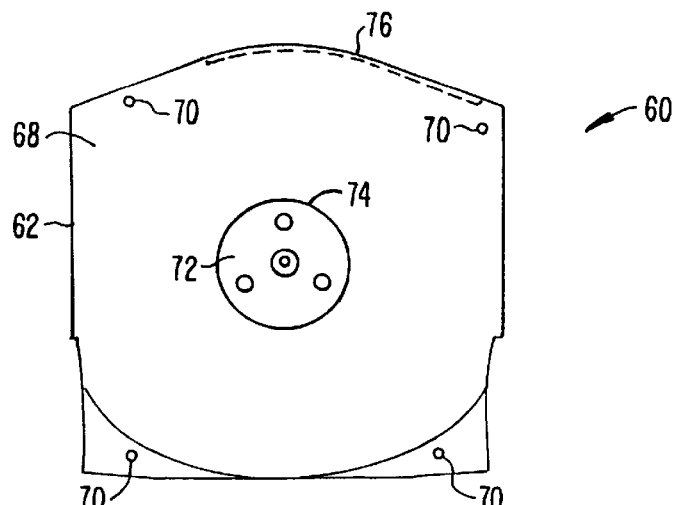
FIG. 3B is a bottom view of the cartridge of FIG. 3, showing a lower cartridge housing.

Perspective, top, and bottom views of cartridge 60 are illustrated in FIGS. 3, 3A, and 3B, respectively. Cartridge 60 generally includes a housing 62 substantially surrounding a disk 64. Cartridge housing 62 will generally be formed as upper and lower cartridge housing portions 66, 68, with the housing portions being held together by screws 70. Housing 62 will typically comprise a polymer material, ideally being formed of a polycarbonate with antistatic properties and including a friction reducing material such as PTFE. The exemplary housing has a width of about 100 millimeters and a length of about 100 millimeters, and the assembled upper and lower housing portions 66, 68 generally have a total thickness of about 7.6 millimeters. The material of the housing will typically have a thickness of about 0.8 millimeters.

Disk 64 will generally comprise a two-sided rigid magnetic recording disk, preferably having a capacity of at least 2.4 gigabytes, and ideally having a capacity of at least 4.7 gigabytes. Alternatively, the structures and methods of the present invention may also find applications for use with cartridges containing optical recording disks, magneto-optical recording structures, floppy disks, and other recording media.

A hub 72 of disk 64 is accessible through an opening 74 of lower cartridge housing portion 68. This access to disk hub 72 allows the spindle drive to engage and rotate the disk while the disk remains within housing 62. Access to the recording surface of disk 64 for the upper and lower data transfer heads is provided through door 76. A simple spring 77 extends between door 76 and housing 62, the spring here being biased to resiliently straighten so as to urge the door closed. Spring 77 will often comprise a spring steel such as piano wire, and the door and housing may include a plurality of engagement locations (as shown) to vary the door closing force during development. Once the design is optimized, production cartridges may include only a single engagement location for each end of the spring.

Figure 3C:
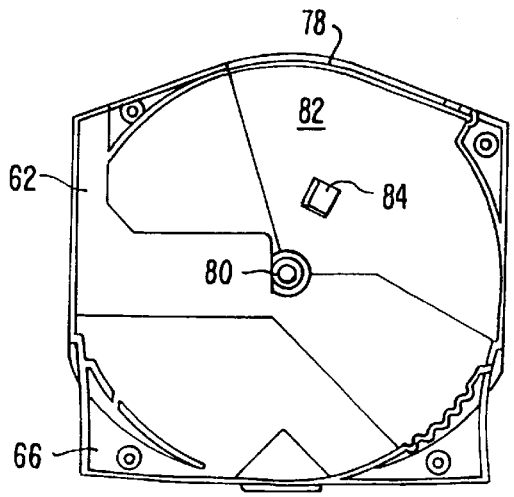
FIG. 3C is a bottom view of the top portion of the cartridge housing, showing some of the internal cartridge structure.

The internal structure of upper housing portion 66 is most clearly seen in FIG. 3C. Door 76 travels laterally within a track 78 along an edge of cartridge housing 62. Door 76 rotates about a pivot 80. An inner surface 82 defines a ramp 84 which protrudes into housing 62. Ramp 84, may alternately comprise a rounded bump, or other feature on the inner surface of the housing. Conveniently, ramp 84 may be formed integrally during the molding of upper housing portion 62.

Figure 4A:
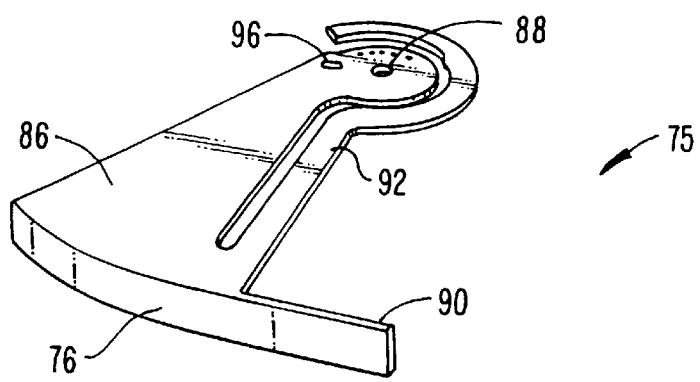
FIG. 4A is a perspective view of an integrally molded door assembly.
Figure 4:
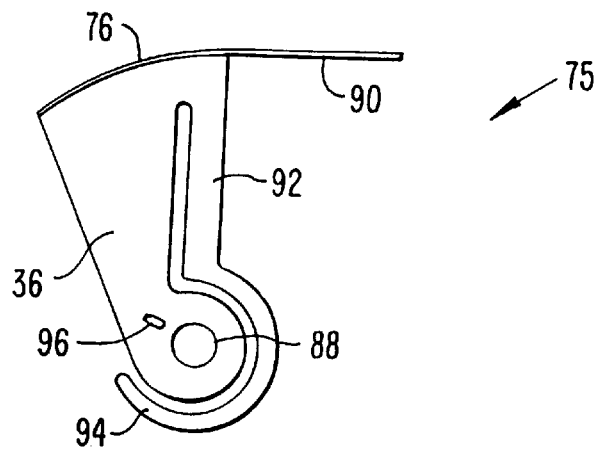
FIG. 4 is a bottom view of the door of the cartridge of FIG. 3, and also shows the resilient arm extending inward from the door.

The structure of a door assembly 75 is seen most clearly in FIGS. 4 and 4A. A door spoke 86 extends inward from door 76 to a door pivot 88, which is adapted to rotatingly engage housing pivot 80 (illustrated in FIG. 3C). As described above, door 76 rides within track 78 in the upper and lower cartridge housing portions. Door 76 includes a flexible portion 90 which can flex to follow tracks having varying curvature.

A resilient arm 92 extends inward from door 76 along the side of spoke 86. Arm 92 and spoke 86 typically comprise substantially planer structures of polymer or metal, while door 76 extends substantially perpendicular to the spoke and arm. An arm extension 94 extend circumferentially about door pivot 88 of spoke 86, but is separated from the spoke so that arm 92 is free to flex independently of the spoke. A slot 96 is provided for actuation of the door, as described hereinbelow. In most embodiments, door assembly 75 will be integrally molded from a polycarbonate as described above, or from another plastic.

As arm 92 extends a considerable distance in cantilever from door 76, the cross section of arm 92 will have a large effect on the resilient characteristics of the arm. In other words, the stiffness of arm 92 may be varied by changing its thickness or width as well as by variations in the arm material. Hence, use of the term "resilient" here refers to the deflectability of the arm structure, rather than to the arm material.

Figure 5A:
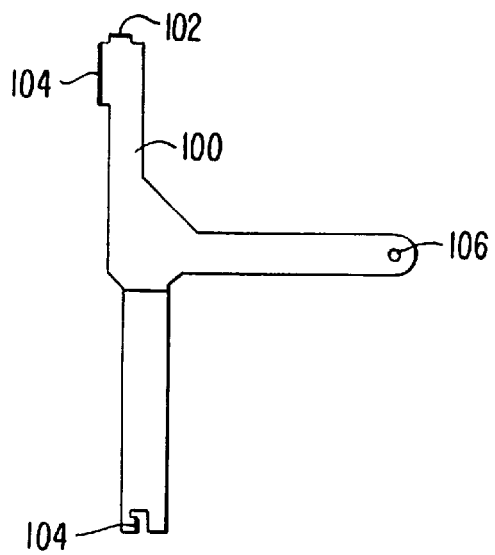
FIG. 5A is a bottom view of the door opening link of FIG. 5.
Figure 5:
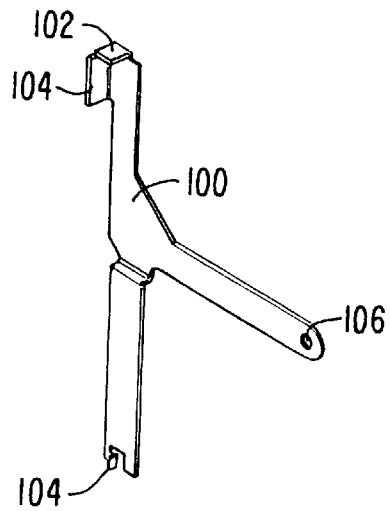
FIG. 5 is a perspective view of the door opening link of the cartridge of FIG. 3.
Figure 6:
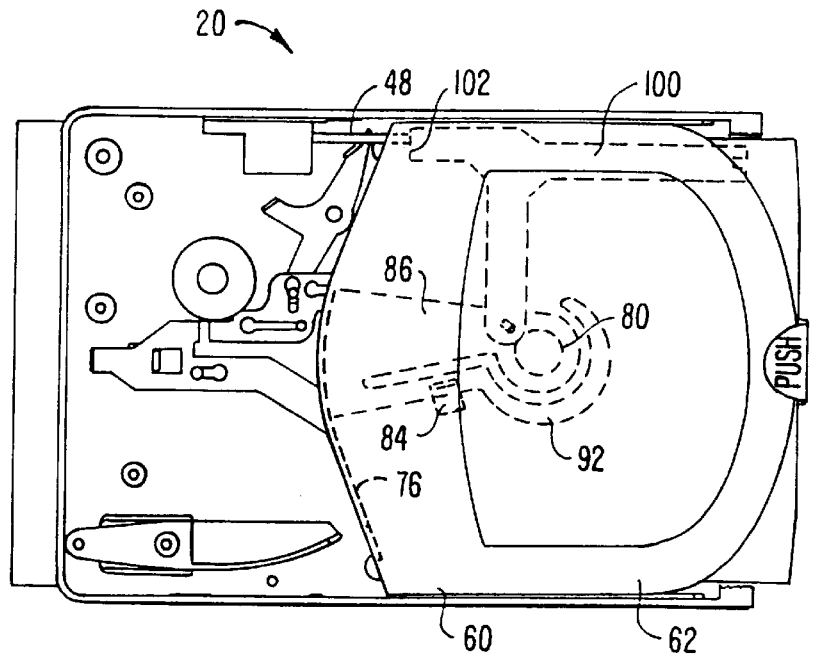
FIG. 6 is a top view illustrating the cartridge of FIG. 3 being inserted into the receptacle of the internal drive of FIG. 2, and also shows how the door actuation bar of the receptacle engages a door opening link to open the door of the cartridge.

Referring now to FIGS. 5, 5A, and 6, a door actuation link 100 includes a driven surface 102 which engages surface 50 of shaft 48 when cartridge 60 is inserted into internal drive 20. Door link 100 includes side tabs 104 which engage corresponding surfaces of cartridge housing 62 so that door link 100 slides substantially along the axis of shaft 48, and so that a door drive pin 106 of door link 100 rotates door spoke 86 about housing hub 80 through slot 96 (see FIG. 4). As a result, door 76 is translated laterally along the edge of cartridge 60. Hence, insertion of cartridge 60 into internal drive 20 results in automatic opening of door 76.

Figure 7A:
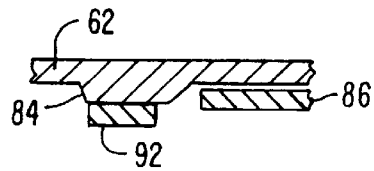
FIGS. 7A–7C are simplified schematics illustrating how the arm ramps up the feature of the inner housing when the door moves to the closed position.
Figure 7B:
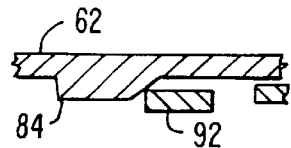
Figure 7C:
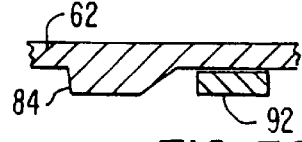

As can be understood with reference to FIGS. 6 and 7A–7C, rotation of the door assembly about housing hub 80 during the opening of door 76 also disengages arm 92 from ramp 84. More specifically, when door 76 is in the closed position, arm 92 is engaged by (and resiliently deflected by) ramp 84, as illustrated in 7A. As door link 100 rotates the door assembly, arm 92 slides along ramp 84 as illustrated in FIG. 7B, until the arm is clear of the ramp as illustrated in 7C. This process is reversed when cartridge 60 is removed from internal drive 20. As the cartridge is removed from the drive, the door biasing spring (see FIG. 3) closes the door so that arm 92 engages and slide along ramp 84. The ramp resiliently deflects arm 92 when door 76 is in the closed position and remains clear of door spoke 86 throughout travel of the door.

Figure 8:
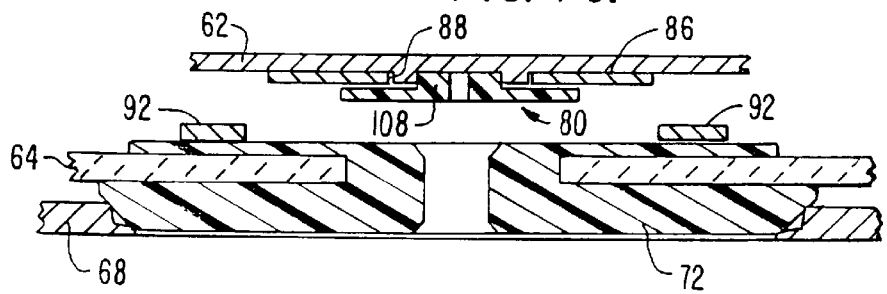
FIG. 8 is a cross-sectional view through a central portion of the cartridge of FIG. 3, and shows the arm biasing the disk against the housing to prevent rattling.

The structure and engagement of housing hub 80 and door hub 88 can be understood with reference to FIGS. 8 and 9. Door spoke 86 is held in place with a brass fitting 108 fixed to upper cartridge housing portion 62. Arm 92 is shown urging disk 64 against the lower housing portion 68, indicating that door 76 is in the closed position so that the arm is deflected by ramp 84. To protect the magnetic recording surface from rattling against the inner surface of the cartridge housing, arm 92 resiliently biases disk hub 72 against the housing material. Engagement between corresponding conical surfaces of the housing and hub help to center the disk and avoid injury to the delicate recording layer structure. As a result of the biasing provided by arm 92, the cartridge may be safely subjected to the movement and minor shocks of everyday handling without risking the loss of the data stored on the disk.

The resilient deflection of arm 92 by ramp 84 is shown most clearly in FIG. 9. The stiffness of arm 92 may be tailored to substantially inhibit movement of hub 72 (and the remainder of disk 64) when the door is in the closed position. The cantilevered support of arm 92 from door assembly 75 is also seen in this cross-sectional view.

Figure 10A:
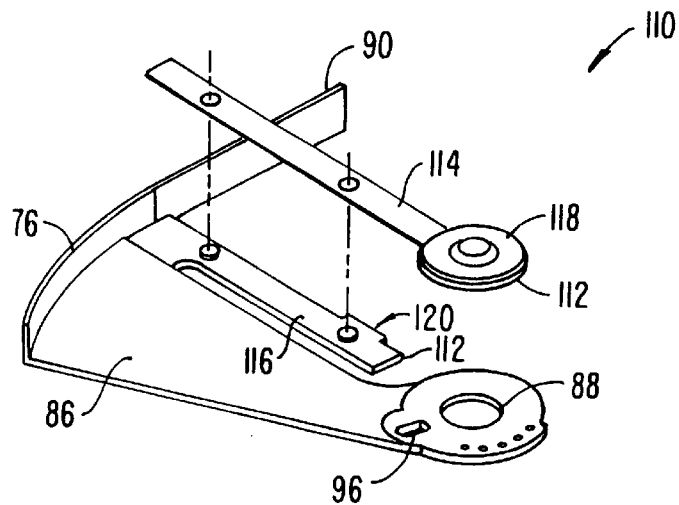
FIGS. 10A and 10B illustrate a door assembly and a housing, respectively, for an alternative embodiment of the removable hard disk cartridge of the present invention.

FIG. 10A illustrates an alternative two-part door assembly 110. Two part door assembly 110 includes many of the integrally molded structures described above with reference to FIG. 4A, but makes use of a two-part arm 112 formed by affixing a metal arm portion 114 to a polymer arm portion 116. Metal arm portion 114 includes an open or closed anti-rattle ring 118 or cap which engages the hub of the disk when the door is closed, but which is deflected clear to allow the disk to rotate when the door opens. Polymer arm portion 112 includes a sloped surface 120 which is adapted to smoothly engage a ramp, rounded bump, or other feature on the inner surface of the housing. Metal arm portion 114 may be affixed to either the upper or lower surface of polymer arm portion 116, and may be bent between the end of the polymer arm portion and anti-rattle ring 118 so that ring 118 is disposed at the proper height relative to the polymer arm portion to releasably engage the hub of the disk.

Figure 10B:
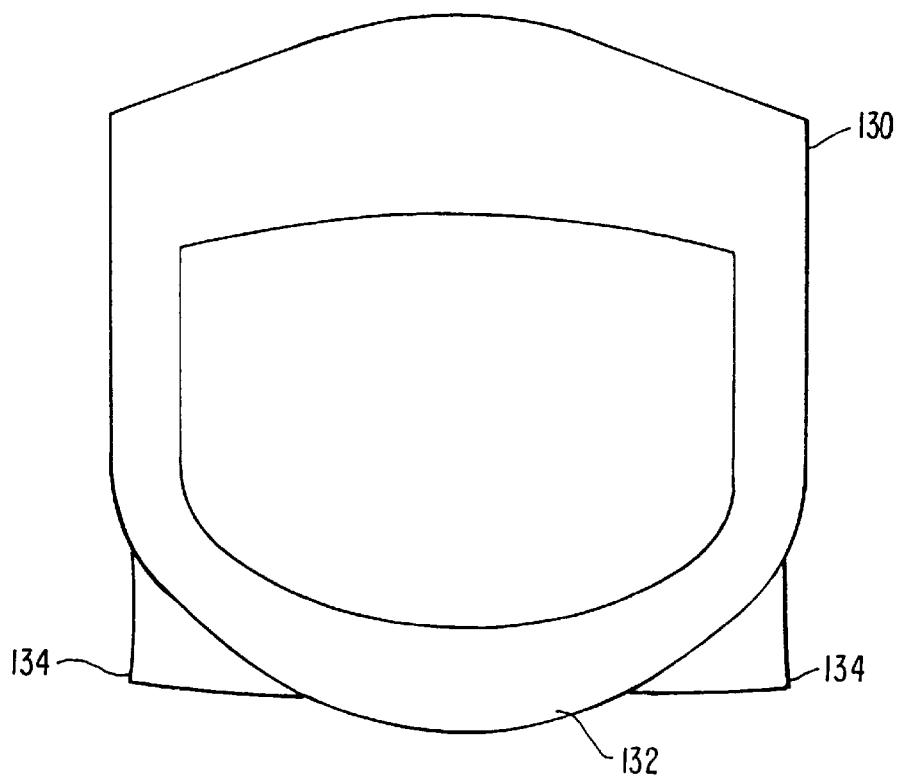

FIG. 10B illustrates an alternative extended housing 130. Extended housing 130 has a ridge or lip 132 protruding rearwardly from the upper rear edge of the housing. Lip 132 extends out of the receptacle of the disk drive when the cartridge is inserted therein, and thereby facilitates insertion of the cartridge by avoiding interference between the user's fingers and the surrounding housing structure. Lip 132 is therefore helpful for persons having large fingers, and may also be used to help remove a stuck cartridge from the receptacle. Extended housing 132 also includes lateral edges 134 that flare outwardly rearwardly, which can make it easier to grasp the cartridge by these edges to pull the cartridge from the drive. This embodiment of the cartridge is illustrated in more detail in U.S. patent application Ser. No. 08/970,491 (Attorney Docket No. 018525-000100), filed concurrently herewith, the full disclosure of which is incorporated herein by reference.

Although the exemplary embodiment has been described in some detail, by way of example and for clarity of understanding, a variety of changes, adaptations, and modifications will be obvious to those skilled in the art. Therefore, the scope of the present invention is limited solely by the amended claims.

What is claimed is:

1. A disk drive system for digital video and other data, the system comprising;
    a cartridge housing;
    a fixed feature attached to the housing;
    a disk disposed within the housing;
    a door mounted to the housing and movable between an open position and a closed position;
    a resilient arm extending from the door, the arm being resiliently deflected by the feature as the door moves between the open position and the closed position so that the arm engages the disk and urges the disk against the cartridge housing when the door is in the closed position; and
    a disk drive having a cartridge receptacle, wherein the cartridge receptacle includes a surface that effects movement of the door from the closed position toward the open position when the cartridge is inserted into the receptacle.

2. A system as claimed in claim 1, wherein the system is adapted for playing a movie.

3. A cartridge for use with a disk drive, the cartridge comprising:
    a cartridge housing having an inner surface, the inner surface of the housing defining an integral fixed ramp;
    a disk disposed within the housing, the disk defining an axis;
    a door mounted to the housing and movable between an open position and a closed position;
    a resilient arm extending from the door, wherein the ramp deflects the arm axially when the door moves between the open position and the closed position so that the arm biases the disk against the cartridge housing when the door is in the closed position.

4. A cartridge as claimed in claim 3, wherein the housing defines a hub, wherein the disk is rotatable within the housing about an axis of the hub, and wherein a door support spoke extends from the hub to the door so that the door rotates about the axis of the hub.

5. A cartridge as claimed in claim 4, wherein the spoke and the arm comprise an integrally formed unit.

6. A disk drive system for digital video and other data, the system comprising;
    a cartridge housing;
    a feature disposed within the housing;
    a disk disposed within the housing;
    a door mounted to the housing and movable between an open position and a closed position;
    an arm extending from the door, the arm being deflected by the feature as the door moves between the open position and the closed position so that the arm urges the disk against the cartridge housing when the door is in the closed position; and
    a disk drive having a cartridge receptacle, wherein the cartridge receptacle includes a surface that effects movement of the door from the closed position toward the open position when the cartridge is inserted into the receptacle;
    wherein the door translates laterally adjacent an edge of the housing within door tracks defined by the housing, wherein the arm extends inwardly from the door beyond the feature and toward a hub of the disk, and wherein a portion of the arm engages the disk hub when the door is in the closed position.

7. A cartridge as claimed in claim 6, wherein an inner end of the arm extends circumferentially about the disk hub.

8. A method for preventing a rigid disk from rattling within a disk cartridge housing after the cartridge is removed from a disk drive, the disk defining an axis, the method comprising biasing the disk against the cartridge housing by deflecting a resilient arm axially by sliding engagement between the arm and the cartridge housing, the arm extending inward from a door of the housing.

9. A video disk cartridge, the cartridge comprising:

a cartridge housing having an inner surface;

a disk having a recording surface and a disk hub with an axis therethrough, the disk rotatably disposed within the cartridge housing;

a door mounted to the cartridge housing and movable between an open position and a closed position;

a resilient arm rotatably coupled to the door; and a fixed feature mounted to the inner surface of the cartridge housing, such that when the door moves from the open position to the closed position, the arm simultaneously rotates to slidingly contact the feature, wherein the arm is axially deflected against the hub of the disk and the hub of the disk is urged against the inner surface of the cartridge housing so as to inhibit rattling.

10. A removable disk cartridge for use in a video disk drive, the disk cartridge comprising:

a cartridge housing having an upper surface, a lower surface and a door movable between an open position and a closed position;

a disk having a recording surface and a disk hub with an axis therethrough; and an arm having a surface for engaging a surface of the cartridge housing, the arm being coupled to the door and movable between a first position and a second position;

wherein the arm moves to the first position when the door moves from the closed position to the open position, wherein the arm moves to the second position when the door moves from the open position to the closed position, such that in the second position the arm flexes axially to resiliently bias against the upper surface of the cartridge housing to urge the disk hub against the lower surface of the cartridge housing.

11. The disk cartridge of claim 10 wherein the upper surface comprises a ramp.

12. The disk cartridge of claim 11, wherein the ramp is integrally formed on the upper surface of the cartridge housing.

13. The disk cartridge of claim 10 further comprising a spring, such that the spring biases the door from the open position to the closed position.

14. A method for preventing a rigid disk from rattling within a disk cartridge housing after the cartridge is removed from a disk drive, the disk defining an axis, the method comprising biasing the disk against the cartridge housing by deflecting a resilient arm axially by sliding engagement between the arm and the cartridge housing.

* * * * *